United States Patent [19]

Knowles et al.

[11] Patent Number: 5,065,345
[45] Date of Patent: Nov. 12, 1991

[54] INTERACTIVE AUDIOVISUAL CONTROL MECHANISM

[75] Inventors: Lance Knowles, San Francisco; Douglas Crane, Portola Valley, both of Calif.

[73] Assignee: DynEd International, Inc., San Francisco, Calif.

[21] Appl. No.: 570,961

[22] Filed: Aug. 21, 1990

Related U.S. Application Data

[63] Continuation of Ser. No. 267,079, Nov. 4, 1988, abandoned.

[51] Int. Cl.⁵ .......................... G06F 15/18; G09B 7/04
[52] U.S. Cl. .................................... 395/154; 434/323; 434/308
[58] Field of Search ............... 434/323, 309, 308, 318, 434/321; 358/341, 342; 364/521, 518

[56] References Cited

U.S. PATENT DOCUMENTS

| | | | |
|---|---|---|---|
| 4,032,897 | 6/1977 | Pooley | 364/900 |
| 4,333,152 | 6/1982 | Best | 364/521 |
| 4,671,772 | 6/1987 | Slade et al. | 434/219 |
| 4,685,003 | 8/1987 | Westland | 360/14.1 |
| 4,698,770 | 10/1987 | Rattan et al. | 364/900 |
| 4,766,581 | 8/1988 | Korn et al. | 369/30 |
| 4,794,465 | 12/1988 | Van Luyt et al. | 358/341 |
| 4,804,328 | 2/1989 | Barrabee | 434/308 |

Primary Examiner—Gary V. Harkcom
Assistant Examiner—Raymond J. Bayerl
Attorney, Agent, or Firm—Irell & Manella

[57] ABSTRACT

An Interactive Audiovisual Control Mechanism (IACM) which, by exploiting recent advances in CD technology which permit rapid random access of discrete audio information (such as an individual sound or utterance), provides for the first time an interactive computer system in which large amounts of high quality audio and video are presented to the user simultaneously. In the preferred embodiment, this is accomplished via random access to both CD/ROM and VD devices, wherein individual visual frames of the VD are displayed on the system's display monitor for specified periods of time while discrete sounds and utterances from the CD/ROM are played through the system's speaker. Audio from the VD and computer's CPU may also be accessed at the same time, as well as computer graphic still images and animation (due to a well-known "GENLOCK" device). A "Control Bar" mechanism provides the user with a consistent user interface which insulates the user from the various sources of this audiovisual information, enabling the user to concentrate on the information itself, not the technology used to present that information. In conjunction with the Control Bar is a "Shuffler" mechanism that provides the user with much of the system's appearance of intelligence. While the Control Bar enables the user to access the desired section of the author's material (by handling the corresponding random access retrieval of the appropriate audiovisual material from its various sources), the Shuffler controls which particular audio and/or visual components the system selects (from the entire domain of material provided by the author), based upon the user's "performance level," which is determined from the user's interaction with the system.

13 Claims, 3 Drawing Sheets

INTERACTIVE AUDIOVISUAL CONTROL MECHANISM

This application is a continuation of application Ser. No. 07/267,079, filed 4 Nov. 1988, now abandoned.

FIELD OF THE INVENTION

This invention relates generally to the field of interactive computer systems and, in particular, to an interactive control mechanism for use in a multimedia computer system.

BACKGROUND OF THE INVENTION

With the advent of compact disk (CD), compact disk/read only memory (CD/ROM) and video disk (VD) digital storage technologies, computer systems are rapidly becoming capable of interacting with users through a variety of different media, facilitating the presentation to users of high quality sound and visual images at access speeds which are acceptable to the user and pedagogically effective. Software developers no longer must rely solely on textual information, or even on computer graphics and animation generated by the computer's central processing unit (CPU), to describe or simulate real-world events. Their arsenal has recently expanded to include high quality reproductions of actual speech and music, as well as live video.

Despite the promise of these technologies, practical multimedia applications have been somewhat slow in coming. One reason for this is the current "read-only" nature of the technology. Because erasable CD technology is not yet commercially available, today's users do not yet have the ability to modify speech, music or data stored on a CD/ROM, or video and audio stored on a VD, through a random access mechanism similar to that used for hard disk magnetic media.

Yet, a wealth of applications still exist even for purely read-only technologies. For example, large databases of unchanging information (such as encyclopedias, historical records or legal case law) can be maintained utilizing the vast storage capacity of CD/ROM drives. The full text of such information can then be searched, giving the user access to tremendous amounts of information.

In the field of education, students can benefit significantly from rapid access to audio and visual information, in addition to the traditional textbook. Presenting the same information multiple times and in varying formats enhances the learning process. Interactive applications, in particular, are seen by many educators as an excellent supplement to the traditional lecture with crude visual aids, because interaction provides the learner with choice and control, key motivators to the learning process.

Although some multimedia learning tools have been developed recently (for example, by connecting a VD to a computer, and enabling users to switch from their computer application to a related video with the touch of a button), these tools have met with limited success. The ideal of the multimedia information database through which users can choose how they wish to navigate is far from being realized.

A primary reason for the limited success of multimedia applications thus far is the current state of VD technology with respect to the simultaneous use of audio and video. Interactive computer programs have thus far been unable to access large amounts of high quality audio and video simultaneously, much less add computer graphics to the mix.

For educational applications in particular, certain thresholds must be met if the learner (user) is to interact with the system in a meaningful way. Delays of many seconds often cannot be tolerated. Sufficiently large amounts of high-quality audio and video information must be accessible in very short periods of time. For such an interactive system to be feasible, a minimum of 60 minutes of continuous or discrete sounds or utterances (FM-quality or better), and 30 minutes of high-quality video, should be accessible within a maximum access time of 1½ seconds.

The audio portion of video disks is currently limited to two audio channels per side, each of approximately thirty minutes in duration. More significant than the limited duration is the necessity of synchronizing both audio tracks with the individual visual frames of the video track. In other words, the audio portion of each track must "line up" with the frames of the video track.

The necessity of synchronizing audio and video on a VD in this manner has not generally been problematic in the case of movies or other traditional videos, because there is a direct one-to-one correspondence between the video images and the soundtrack which is meant to be played at the same time such images are displayed. Interactive computer systems, however, are hindered significantly by the necessity of synchronizing the audio and video tracks in this manner.

For example, consider a simple interactive computer system in which the user sees the video images of a person giving a speech, but can select whether the accompanying audio is in English or in a translated language such as Japanese. Such a system might be useful for teaching English to Japanese-speaking persons. The English voice can be synchronized with the individual video images on one of the two VD audio tracks. The Japanese translation, however, cannot easily be synchronized with those same video images, because the Japanese audio portion is of a longer duration than the corresponding English portion. This presents a problem, which occurs in many applications requiring the synchronization of video to multiple audio segments.

One previous solution to such synchronization problems has been to duplicate the video images in several places on the VD, synchronizing each corresponding audio portion to a unique set of video images. This "solution," however, is extremely wasteful of the limited space on a VD, and is thus not feasible for non-trivial applications.

Another seemingly logical solution to this problem is to freeze individual video frames while the audio portion plays. On a VD, however, this technique (known as "Still Frame Audio") results in extremely poor sound quality, approximating that of AM radio, which is inadequate for applications requiring more realistic FM-quality or even CD-quality sound. Moreover, the process of packing and aligning audio into a single video frame is quite complex and significantly more expensive than simply recording audio onto a CD.

It is therefore not surprising that interactive computer systems, by relying primarily on VD technology with its inherent synchronization of audio and video, have thus far been unsuccessful in providing users with access to large amounts of high quality audio and video simultaneously.

Until recently, high quality audio from a CD has only been accessible by "track" (approximately 100 per CD), enabling only limited access, for example, to each song of an album. Yet, with the advent of recent developments in CD technology, it is now possible to access individual sounds or utterances on a CD within a single track, via random access techniques similar to those employed for hard disk magnetic media, and with an access time that is acceptable to the user. No interactive computer system known to the inventors has yet exploited this technology, perhaps because it is so new, or perhaps because the VD is currently the only medium which provides synchronization of high quality audio and video.

Moreover, additional problems remain with today's interactive computer systems, particularly with respect to the goal of giving the user the appearance that the system possesses intelligence in the form of a vast array of information which the user can access at will (requiring that large amounts of high quality audio and video be available at an effective access time of no more than 1½ seconds).

One such problem relates to the practical requirement that such systems enable the user to concentrate on the information which he or she desires to access. The system should, at the very least, "know" where the information resides, insulating the user from the source of that information (whether CD, VD or the computer's CPU), and from the process of accessing that information from these various sources without having to wait beyond a minimum threshold of time.

In addition, such systems should also be capable of interfacing with users of differing levels of experience and expertise. In the past, interactive computer systems have simply provided an "average" level of expertise, or multiple levels which users can reach by progressing through the lower levels. Even "hypertext" systems, which enable users to access information linked in a non-sequential manner, have thus far not provided the depth of choice necessary to give the system the appearance of intelligence. It is important that users not only have a choice of "where to go next," but also that users are presented with a sufficient variety of information and choices, reflecting various levels of expertise.

Thus, current interactive computer systems have been unable to provide users with access to large amounts of high quality audio and video simultaneously, and have also been unable to provide the appearance of sufficient intelligence to allow the user to focus on the information itself, and remain insulated from the technology and the limited choices of information to which the user has access.

SUMMARY OF THE INVENTION

Exploiting the recent advances in CD technology, which enable the random access of discrete audio information (such as an individual sound or utterance), this invention, the Interactive Audiovisual Control Mechanism (IACM) provides for the first time an interactive computer system in which large amounts of high quality audio and video are presented to the user simultaneously. In the preferred embodiment described below, this is accomplished via random access to both CD/ROM and VD devices, wherein individual visual frames of the VD are displayed on the system's display monitor for specified periods of time while discrete sounds and utterances from the CD/ROM are played through the system's speaker.

Of course, the VD soundtrack can also be played at the same time, though, as mentioned above, its utility is significantly more restricted due to video synchronization requirements. Computer graphic still images and animation are also accessible as a layer on top of the video, due to a well-known "GENLOCK" device which permits simultaneous display of both video and computer graphics.

The "Control Bar" mechanism itself is designed to insulate the user from the various sources of this audiovisual information. In other words, the user need not be concerned with (or even be aware of) whether sound originates from the CD, VD or CPU. He or she need only know that the sound comes out of the speaker and is associated with a particular visual display, perhaps in response to the user's previous interaction with the system (e.g., by selecting a picture using an input device, such as a mouse, light pen or keyboard). Similarly, the user need not know whether particular visual images originate from the VD or the CPU. In short, the user is left free to concentrate on the information itself, not the technology used to present that information. Moreover, due to access times of less than 1½ seconds, the user is spared the frustration of having to wait for unnatural periods of time.

The Control Bar has also been designed to provide a consistent user interface between the user and virtually any interactive system the developer can create. Regardless of the application, the Control Bar provides the user with a means of controlling the presentation and sequencing of the audiovisual information.

Some of the control "buttons" (which the user selects to invoke certain actions), such as the "forward," "reverse" and "repeat" buttons, appear at first glance to correspond to buttons found on tape decks, videocassette recorders and other common audio and video equipment. Yet, these buttons do not in fact correspond to controls found on any physical device, including the actual CD/ROM and VD players used in the preferred embodiment as sources of the high quality audiovisual information to which the user is provided access.

Instead, these buttons enable the application developer or author to provide the user with "conceptually sequential" access (in the preferred embodiment) to the information being displayed. Other embodiments might, of course, provide the user with non-sequential forms of access unique to particular applications.

Even in the preferred embodiment, the author's presentation of this audiovisual information may be purely linear (e.g., displaying ten images in sequence while related sounds are played), or may consist of non-sequential "hypertext-like" links between related sounds and images, enabling the user to select a particular link to a related sound or image by interacting with the system. The format designed by the author determines the meaning of going "forward" or "backward" through the author's material, and does not necessarily correspond to the physical location of the sounds and images themselves (which are obtained via random access to the CD/ROM, VD and CPU devices).

In the preferred embodiment, the Control Bar also includes buttons corresponding to the specific application, which in this case is a "Language Learning System" for teaching English to Japanese businessmen. Such buttons include a text button labeled "ABC" (which, when invoked, causes text to be displayed, corresponding to the speech being played) and a translation button labeled with the flag of the country from which the translated language originates (which, when invoked, causes the previous phrase or utterance to be repeated in the specified translated language, which in this case is Japanese).

In conjunction with the Control Bar is a "Shuffler" mechanism that provides the user with much of the system's appearance of intelligence. While the Control Bar enables the user to access the desired section of the author's material (by handling the corresponding random access retrieval of the appropriate audiovisual material from its various sources), the Shuffler controls which particular audio and/or visual components the system selects (from the entire domain of material provided by the author), based upon the user's "performance level," which is determined from the user's previous interaction with the system (with no perceivable delay).

For example, for particular utterances, the Shuffler might have only one option from which to choose, because the user is at the most introductory level of a particular application or portion thereof. As the user progresses, however, and demonstrates his or her progress to the system (e.g., by answering questions correctly, or by selecting sensible or appropriate combinations of words and/or pictures), the Shuffler will randomly select and construct, from multiple choices supplied by the author, a particular audio and/or visual sequence of audiovisual inputs to present to the user.

This technique enables the system to provide automatically not only redundancy (as previous choices, i.e., audiovisual responses, might be selected again even at higher levels), but also increasing complexity (as new, perhaps more complex, choices are selected at higher levels), both of which are key ingredients of the learning process. The Shuffler mechanism allows for a balance of previously introduced material with glimpses or foreshadowing of material yet to be introduced. The weighting of this balance is determined either by a student's performance in interactive events or by the student's choice of level through the shuffler level control.

In this manner, users at differing intellectual and/or experimental levels are presented not with an "average" level of complexity, or with tiers of complexity (which users can often memorize), but rather with an integrated system which is in part unchanging (as redundant audiovisual information is presented to the user) and in part increasing in complexity (as new, possibly more complex, audiovisual information or concepts are also presented to the user). As the author provides a greater depth of choices, the user is significantly less likely to memorize a pattern, because the changes are not merely linear, but essentially exponential, due to the random selection of many discrete sounds and visual images.

The Shuffler is thus much more than a mere "branching" mechanism. It also provides significant "depth" (through its use of redundancy as well as increased complexity) which presents to the user an apparently intelligent system.

Although the preferred embodiment of this invention described below reveals a Language Learning System for teaching English to Japanese businessmen, many other embodiments of this invention (involving the simultaneous presentation of high quality audio and visual information in an interactive environment) will be obvious from the description provided below.

DETAILED DESCRIPTION OF PREFERRED EMBODIMENT

Figure 1:
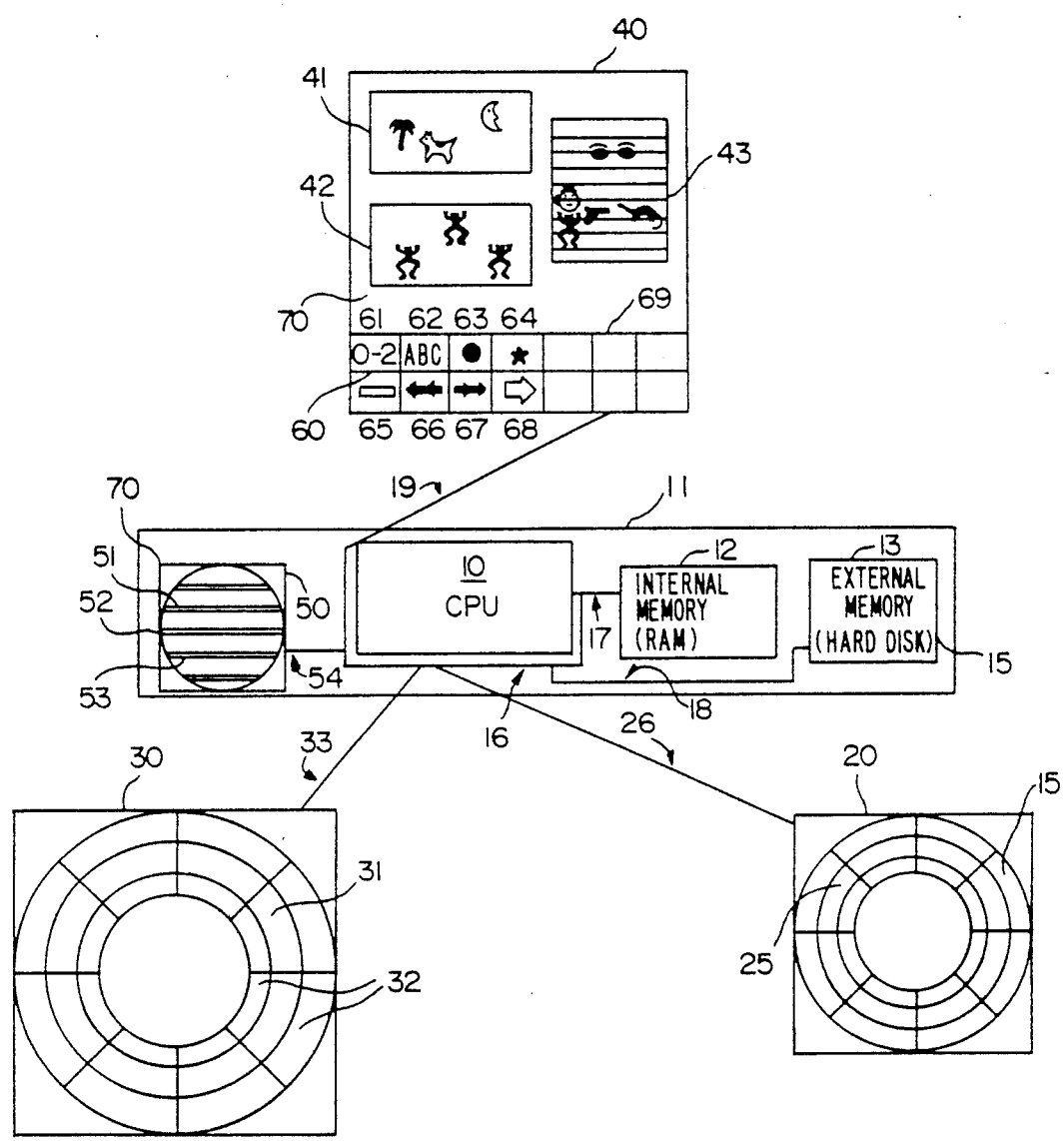
FIG. 1 illustrates a block diagram of the system configuration of the Interactive Audiovisual Control Mechanism (IACM).

The configuration of the preferred embodiment of the IACM is illustrated in block diagram form in FIG. 1. As mentioned above, the particular application to which this configuration is applied is a Language Learning System designed to teach English to Japanese learners of English. This particular application is described in greater detail below.

The central control of the IACM stems from the central processing unit (CPU) 10 of the computer (in this embodiment, an IBM AT-compatible personal computer) 11. All instructions executed by CPU 10 are first loaded into internal random access memory (RAM) 12 from some external memory source, such as hard disk 13. Rather than require the user of the IACM to own a hard disk drive, all software 15 in this embodiment is stored on CD/ROM and accessed through CD/ROM player 20.

Thus, CPU 10 receives and executes individual instructions from RAM 12 (via local bus 17 and system bus 16), originally loaded from either hard disk 13 (via local buses 17 and 18) or CD/ROM player 20 (via system bus 16 and local bus 17). The software 15 controls CPU 10 through these instructions, causing it to play sounds through speaker 50 and display visual images on monitor 40.

Speaker 50 can play audio generated from or stored in three different sources (CPU 10, CD/ROM player 20 and VD Player 30). Both the CD/ROM Player 20 and the VD Player 30 store high quality digital audio 25 and 32, respectively. CD/ROM Player 20 also can store binary data or software 15, in addition to digital audio 25. All three sources of audio are played through speaker 50 (see 51, 52 and 53) in this embodiment, which receives such audio via local bus 54 and system bus 16.

VD Player 30 can, of course, also store high quality digital video images, synchronized on each track with two surrounding tracks of digital audio 32 (as mentioned above). In addition, CPU 10 can generate and display on monitor 40 still graphic images 41 and animated graphic images 42, as well as display digital video images 43, generated (see 31) by VD Player 30. The CPU accesses digital audio and video from the VD Player 30 via local bus 33 and system bus 16, and accesses digital audio and binary data from the CD/ROM Player 20 via local bus 26 and system bus 16. All forms of computer graphics and video are displayed on monitor 40 in this embodiment, which receives its visual images via local bus 19 and system bus 16.

This configuration in FIG. 1 illustrates how software 15 can control CPU 10, causing it to display various visual images (including still graphic images 41, animated graphic images 42 and video images 43) while corresponding audio sounds 51, 52 and 53 are simultaneously being played through speaker 50. At any given time, the resulting output, including the entire audiovisual display on monitor 40 with corresponding audio output through speaker 50, is referred to as an Audiovisual Frame 70. Multiple Audiovisual Frames are referred to as an Audiovisual Frame Segment. An Audiovisual Frame Segment may consist of a single picture frozen on the screen while the corresponding audio is played (e.g., a man talking), or may consist of changing audio and/or visual effects (e.g., a movie with soundtrack, perhaps with overlayed computer animation).

As mentioned above, a key difficulty in previous interactive systems was their inability to play large amounts of high quality audio corresponding to the visual images being displayed. Due to recent developments in CD/ROM (CDI, DVI, etc.) technology, however, it is now possible to retrieve discrete audio sounds and utterances from a CD/ROM through random access techniques. Current CD/ROM players, for example, can store approximately 60-75 minutes of high quality digital audio (on each of two channels if stereo sound is not required) and, more importantly, can access a single audio "frame" (constituting about 1/75th of a second of sound) within less than one second (which is well within the 1½ second threshold beyond which learners are often unwilling to wait). Thus, small audio components (such as a single sound or a few words of speech) can now be accessed precisely from a CD/ROM through low-level software drivers easily written to conform to the specifications provided by the manufacturers of such CD/ROM players. By permitting sound to be sampled at lower sampling rates, future CD/ROM players will be able to record at least 10-20 hours of slightly lower quality sound (e.g., FM-quality sound as opposed to CD-quality sound), still well within the sound-quality threshold required for many educational applications.

Similar random access techniques are well known for VD players. However, when multiple audio output is desired for the same video frames (a common occurrence in interactive computer systems, unlike movies), it is often not feasible to utilize the audio tracks of the VD player, due to the synchronization problems discussed above. The IACM configuration illustrated in FIG. 1 enables audio to be accessed from either VD player 30 (when that audio, in essence, "belongs" to the visual images being displayed) or from CD/ROM player 20 (when various audio choices are required, based in part upon the user's interaction with the system). Of course, the CPU can also generate sound 51 dynamically (while the system is running), as well as still 41 and animated 42 graphic images.

There are significant advantages of simultaneous presentation of high quality sound and visual images, both for the user of the system and for the developer of interactive programs. The same information can be conveyed by the author or developer of such systems in various forms (relying on text, graphics, animation, video, sound and combinations thereof), thereby facilitating the learning process. Certain individuals will be more responsive to visual media, while others may prefer purely textual information and still others may respond better to actual video. The developer or author of an interactive program must provide an effective interface to the user, maximizing user choice and control, and separating the user from the sources of the information presented, thereby enabling the user to interact with that information in a meaningful way.

One way in which the user interface of the IACM meets these objectives is through the "Control Bar" 60, by which the user can control any interactive application running on the system. At first glance, the Control Bar 70 looks like a control panel for a tape, CD or VD player. Yet, as will be apparent, the purpose and function of the Control Bar is not to control directly the CD/ROM player 20 or the VD player 30, but rather to control the particular application which happens to be running, through basic commands common to such applications. Some of these commands are, in this embodiment, optimized for use with the set of applications developed for the Learning Language System. Others, however, are quite useful for virtually any type of interactive application one could develop for the IACM.

For example, the forward 67 and reverse 66 buttons function consistently with most any interactive application. The author could design, for instance, a particular Audiovisual Frame Segment consisting of a linear set of Audiovisual Frames depicting a man giving a speech. By selecting (or even continuously pressing) the forward button 67, the user can cause the program to skip certain Audiovisual Frames and resume later in the linear sequence. Similarly, the reverse button 66 would cause the program to resume earlier in the sequence. In either case, the presentation will resume when the user presses the "stop/play" button 68.

Although it is possible merely to present the output of the VD player to the user, and have these buttons act as the corresponding VD player controls, the Control Bar is a far more powerful concept. For example, at any given time, the Audiovisual Frame being displayed might consist not only of video images 43 from VD player 30, but also of animated graphic images 42 overlayed upon the video. Moreover, that Audiovisual Frame might also consist of corresponding sounds accessed from CD/ROM player 20 (which sounds might vary depending upon the user's performance level, discussed below).

The forward button 67 now corresponds not to the VD player's forward button, and, in fact, may cause video images to be displayed which are physically present earlier on the videodisk itself, requiring the Control Bar to cause VD player 30 to "reverse" back to those earlier images. Even if the interactive application presents sequential Audiovisual Frames, those frames do not necessarily correspond with information stored sequentially on any device. Instead, the interactive application may well retrieve, via random access, bits and pieces of audio and visual information from various physical locations on a variety of storage media, including the CD/ROM player 20 and VD player 30.

Thus, the precise meanings of forward and reverse may change depending upon the particular application, as well as the sequential or non-sequential links among the audio and visual information. The other buttons of the Control Bar will be explained in greater detail below, in the context of the Language Learning System.

In addition to the Control Bar, which enables the user to control the sequencing of Audiovisual Frame Segments, the Shuffler mechanism (not shown in FIG. 1) provides the user with the impression that the IACM system possesses intelligence, by varying the information or conceptual complexity presented in each Audiovisual Frame Segment, depending upon the user's performance level (determined from the user's previous interaction with the system).

In general, the Shuffler is a mechanism for selecting an Audiovisual Frame Segment (or sequences of Audiovisual Frame Segments) from among a varying domain of possible choices supplied by the author. Note that the size of the domain is determined by the student's performance level. In this particular application, the Shuffler utilizes a random number generator to select one of the possible audio utterances (corresponding to particular visual images being displayed on monitor 40) from the domain of possible choices supplied by the author.

For example, one of the characters utilized to teach English (in the preferred embodiment) is a character named "Max." Max's picture is displayed on monitor 40 utilizing animated computer graphics. While Max's mouth is moving, Max utters a phrase in English. When the user first begins working with the system, his or her performance level is the lowest possible level. However, as the user begins to answer questions correctly, or supply appropriate interactive responses, that performance level increases. Conversely, as the user begins to make mistakes, that performance level decreases.

At each decision point (i.e., just prior to the presentation of each Audiovisual Frame Segment), the Shuffler goes into action, selecting Max's utterance at random from among the varying domain of possible utterances (with no perceivable delay). At the lowest performance level, the domain might only be one utterance, which will of course be selected. At higher levels, the author may have supplied additional utterances, which will provide the user with both redundancy (in the event that the same utterance from lower levels is again selected) and with increasing complexity (as new utterances, whether or not of greater complexity, are supplied). The precise operation of the Shuffler mechanism is explained below, in the context of the Language Learning System.

The Authoring Language

The Control Bar and Shuffler mechanisms are implemented in softwar 15 (though, in another embodiment, they could be implemented with different software, or even purely in hardware). In addition to the low-level drivers (well known in the art) which implement the actual random access retrieval of audio, video and data from the computer's RAM 12 and hard disk 13, as well as from the CD/ROM player 20 and VD player 30, the software 15 implements an "Authoring Language" which enables the developer or author of an interactive application to adapt the Control Bar and Shuffler mechanisms to that particular application.

The Authoring Language in this embodiment is optimized for the Language Learning System, which is designed to teach English to Japanese businessmen. In order to create an interactive application for the Language Learning System, the author must first prepare a set of files.

Most of these files are simply data files. One such file is the "dictionary" file, which provides the author with a mechanism to supply words for use with the dictionary function of this application (which enables the user to look up the meaning of words, and see related words and phrases in context). This file consists simply of a set of words (and related words) with two-character codes for identification and retrieval. Another file which the author must create is known as the "word" file, which contains a list of each word (and a corresponding number used to access that word) to be generated by the computer (as opposed to the CD/ROM or VD players) for that particular application. The author must also create a "pics" file, which contains an encoded number used to access each picture (stored in a related file) for that application, along with characteristics of the picture, such as its dimensions and the relative position of the portion, if any, of that picture which is to be animated (by displaying it with other, similar pictures).

The last two files which the author must create are the "script" file (which controls the entire application) and the "sound" file (which controls each Audiovisual Frame Segment, not merely the audio portion).

In essence, the sound file contains the directions to the low level driver software for controlling the actual CD/ROM and VD players. The sound file contains a series of commands (each with a unique number) corresponding to particular Audiovisual Frame Segments—e.g., the display of a particular series of video images from the VD player, a time delay, and then the related audio portion. Those commands include a number indicating the "shuffler" level to which that Audiovisual Frame Segment pertains (so that the size of the domain from which the audio portion is selected can be determined) and a letter indicating the language of the audio portion (in this case, "E" for English, which always precedes the translated "J" for Japanese).

For each audio phrase or utterance (or perhaps entire speech), the author must indicate which frames, if any, of the CD/ROM or VD player should be played (e.g., 21222–21444 to indicate that frames 21,222 through 21,444 of the CD/ROM player should be played, with a "-" used for CD/ROM, a "v" used for VD and an "s" used for a set of VD frames displayed at a specified rate not necessarily equal to 30 per second), as well as a time delay, if any, before displaying specified words or pictures on the monitor. For example, a picture might be displayed 2 seconds after the video begins, any portion of which could be animated, or highlighted words could be displayed. This information is followed by the actual words of the sentence (which the user can elect to display) in the appropriate language, along with dictionary encodings (to enable the user to select those words and cause the appropriate page of the dictionary to appear on the monitor).

The script file controls the entire application through (in this embodiment) the following 17 commands:

1. "A" (Activate Dictation)

This command is used for a "dictation" module in which the user hears a word or sentence, and indicates understanding by "touching" (e.g., with a mouse or other pointing device) the appropriate word or visual element on the monitor. Once this command is executed, the system waits for the user to touch the appropriate elements.

2. "B" (Box)

This command is used to cause the monitor to display text or computer graphics (in a predefined box or window). The author must indicate the number corresponding to the words and/or graphics to be displayed (as defined in the "words" and "pics" file), the boxes in which to display the text or graphics (via an encoded row number) and another number to indicate whether the text or graphics should be visible immediately. This command precedes a "Sound" command, indicating that the specified text or graphics corresponds to the particular audio and/or video activated through the Sound command. By specifying "Xs" in all of the boxes, the author can also cause the upper portion of the monitor to be cleared when the next Sound command is executed.

3. "C" (Combination)

This command causes the system to wait for the user to touch a combination of boxes on the monitor. Touching 10 boxes or the "DynEd Bell" graphic will end the sequence. This command is preceded by "P" commands which activate "touch points" on the monitor for the user to select. Through this command, the user can indicate knowledge of a spoken sentence, for example, by touching visual elements corresponding to that sentence.

4. "D" (Delay)

This command causes the system to pause for the specified "hundredths of a second" so that, for example, appropriate pauses can be inserted in between spoken sentences. The user can actually set a "pause multiplier" (from 0 to 9/5 of a second in 1/5 of a second increments), which is then multiplied by the specified delay time.

5. "E" (Erase)

This command erases the upper portion of the monitor (which, in this embodiment, is frequently used to display particular textual and/or graphic elements). The Box command can also be used for this purpose, although the Erase command will erase the upper portion of the screen immediately, rather than waiting for the completion of the next Sound command.

6. "J" (Jump)

This command simply transfers execution non-sequentially to the specified label of the desired instruction.

7. "L" (Level)

This command modifies the user's performance or "shuffler" level, by raising or lowering that level by the specified amount. In this way, the author can gauge the user's progress, monitor correct and incorrect responses, and modify, via this command, the user's performance level accordingly (up or down). The user can also specify the desired level manually through the "Control Panel" mentioned below.

8. "P" (Touch Points)

This command activates "touch points" on the monitor, enabling the user to interact with the system by answering questions and giving other responses via the keyboard, mouse or other input device. The author must specify a number corresponding to one of the predefined touch points (78 in this embodiment), and a label to which the program will transfer execution if the user selects that touch point.

9. "Q" (Quit)

This command ends the current lesson, and causes the system to display the list of all available lessons.

10. "R" (Return)

This command causes execution to return from a subroutine invoked by the author (via the "Use" command described below).

11. "S" (Sound)

This command causes the CD/ROM or VD player to play the sound corresponding to the specified number. That sound may correspond to synchronized video (for the VD player) and/or to the most recently specified textual or graphic elements which are displayed on the monitor. The precise timing of the audio/visual synchronization can be accomplished via combinations of the Delay command in the script file and timing delays specified within the sound file itself (as mentioned above).

12. "T" (Touch)

This command causes the system to wait for the user to select a touch point on the monitor (previously activated by "P" commands mentioned above, which dictate where execution will be transferred when each touch point is selected).

13. "U" (Use)

This command invokes the subroutine corresponding to the specified label, and transfers execution to the sequence of commands at that label (until the Return command is reached, at which point execution is transferred back to the command immediately following this Use command).

14. "V" (Video)

This command opens or closes a "video window" (in which actual video images from the VD player are displayed), at the specified rectangular coordinates on the monitor. Video windows must be opened before a Sound command is issued, if that command causes video images from the VD player to be displayed. Similarly, that window must then be closed to deactivate that area of the monitor.

15. "W" (Watch)

This command sets a "clock" which causes execution to be returned to the next command after the specified time.

16. "#" (Score Adjust)

This command raises or lowers the user's "score," which is maintained (as the author desires) to provide the user with interactive feedback regarding his or her progress.

17. "?" (Random Jump)

This command causes execution to be transferred randomly to one of the N labels specified by the author immediately following this command. This command requires that the author also specify the number of possible choices before listing the choices themselves.

The above commands are implemented by additional software which is relatively easily written by one skilled in the art of programming. It is important to note that the IACM system can be implemented in a variety of ways, and that the above commands implement only one form of Authoring Language, and many other such languages (whether implemented in software or hardware) can be devised to implement the IACM system, including the Control Bar and Shuffler mechanisms.

Writing scripts and related files in the Authoring Language requires virtually no computer programming experience. The Authoring Language is intended for use by educators and other authors who desire to create interactive applications for multimedia computer systems.

An important feature of any implementation of the Control Bar is its "event driven" nature. The user should have the ability to interrupt the execution of the application at virtually any time via the Control Bar. This feature of "modeless" control and choice is very important to the learning process and gives the program its feeling of "life." The Control Bar interface allows learner and author to interact in a manner which is truly dynamic. It isn't necessary to wait for certain specified times in the program when interaction is allowed. The Control Bar interface in this embodiment is constantly watching for student input through the mouse (or other input device).

The particular implementations of the Control Bar and Shuffler mechanisms are best illustrated through short examples of script commands, as provided below.

"Meet Max and Kathy: An Example Utilizing the Control Bar and Shuffler Features of the IACM"

The Language Learning System application, as implemented in the preferred embodiment of this invention, comprises a number of functional "modules" (separate units of the author's application) designed to teach English to Japanese learners of English. One module is designed to focus on "business" English, including charts, graphs and other methods of illustrating quantitative information. Another module is for advanced users, and includes more "real world" situations illustrated on video via the VD player.

The examples discussed below are from the introductory "Meet Max and Kathy" module, which illustrates how the Control Bar, Shuffler and other mechanisms are implemented in the IACM system. For each module, the IACM includes a number of separate "lessons" (or sub-modules). The Meet Max and Kathy module includes lessons for grammar, dictation, vocabulary and others, including the introductory "Listening" lesson described below.

The Listening lesson introduces the Max and Kathy characters, primarily utilizing high quality audio stored on CD/ROM for the individual utterances of Max, Kathy and other characters (each of which is depicted using computer graphics and animation, as well as digital video and accompanying sound from the VD player. The purpose of this lesson is to present very simple English words, phrases and sentences, gradually increasing in variety and complexity as the user indicates his or her understanding of the material, with an emphasis on simple concepts illustrated with graphic images of the characters and the cities and countries in which they reside.

As shown below, the Control Bar enables the user to "control the lesson," by advancing to view new information, rewinding to review material again, pausing the lesson or repeating the most recent utterance (either in English or Japanese), and even electing to display the text of that utterance (also in either English or Japanese).

What is significant is that the Control Bar enables the user to control the sequencing of the lesson, without regard to the fact that the software is automatically controlling the random access retrieval of the appropriate sounds and images from the CD/ROM and VD players, as well as sounds and images generated by the CPU itself. Certain audio may correspond to two graphic characters speaking to each other. One voice might be stored on CD/ROM while the other is stored on videodisk. The user need not be concerned with such details. The Control Bar insulates the user from such details by providing an extremely high-level interface far removed from the actual technology used to store and access the high quality audio and visual information which makes up a lesson.

The Shuffler mechanism is even more "invisible" to the user, as the examples below illustrate. By the time a character speaks, using a simple phrase such as, "Hello, my name is Max," the Shuffler has already performed its task, randomly selecting that phrase from among a larger domain of choices, the size of which is determined by the user's "shuffler" (performance) level, limited of course by the total number of choices supplied by the author for each utterance.

What is significant here is that, as the user progresses, the active domain of each set of utterances (of which there could be hundreds or more in any given lesson) increases (in a range from one up to the total number of utterances supplied by the author). More complex phrases can be introduced, in addition to the added complexity due merely to variation. Moreover, redundancy (due to past utterances randomly being selected again) is also introduced to reinforce previous concepts.

The Meet Max and Kathy lesson is activated by the user from a module menu, at which time a lesson menu appears, from which the user can select the introductory "Listening" lesson. This lesson begins with a linear sequence of Audiovisual Frames Segments, consisting of computer graphics and animation used to introduce the "Max" and "Kathy" characters, accompanied by sound (primarily from the CD/ROM player) representing the voices of those characters.

For example, the script causes a graphic of Max's face to be displayed on the screen via the following three Box commands:

| B 1 | XXX,XXX,XXX,XXX,XXX |
| B 2 | XXX,112,XXX,XXX,XXX |
| B 3 | XXX,XXX,XXX,XXX,XXX |

These three commands correspond to the three rows of boxes on the upper portion of the screen. The "112" designation causes the picture of Max's face (picture number "12") to be displayed in the second box from the left in the second row of boxes. The "1" preceding the picture number indicates that the picture is to be displayed immediately upon execution of the Box command.

After causing Max's face to be displayed, the script includes the following four commands:

| D 050 |
| S 10010 |
| D 100 |
| S 20010 |

The Delay ("D") commands cause $\frac{1}{2}$ second and 1 second delays, respectively (assuming that the "pause multiplier" is set to 1), between the execution of the Sound "S" commands, which cause Max to speak. To understand the effect of the Sound commands, one must refer to the portions of the sound file corresponding to those commands. The sound file contains the following information for the above two Sound commands:

10010
1E 019360-019453    050,414
[This]AG [is]AA Max.
1J 019495-019680    050,414
Kono hito wa Max desu.

```
                                -continued
20010
1E  019720-019865      000,112 000,114
Hello, [my]AH name [is]AA Max.
1J  019942-020148
Konnichi wa. Watashi no namae wa Max desu.
2E  020225-020360      000,112 000,114
Hello. [I'm]AA Max.
2J  020445-020620
Konnichi wa. Watashi wa Max desu.
3E  020722-021002      000,112 000,114
Hi. [my]AH name [is]AA Maxwell. [but]AK people call me Max.
3J  021090-021525
Konnichi wa. Watashi no namae wa Maxwell desu, demo minna
wa Max to yobimasu.
```

The first Sound command (10010) contains only one choice of utterance in the sound file, which will thus be selected, regardless of the user's performance level, whenever that sound file is called for in any and all branches of the lesson. The "1E" and "1J" designations indicate the first (and only) performance level choice of utterances (in both English and Japanese). The numbers, as mentioned above, denote the "frames" (each approximately 1/75th of a second of audio) of the CD/ROM which will be played. The next two numbers ("050,414") indicate a delay of 050/100 or ½ second from the time the CD/ROM player begins playing the specified utterance, after which time a red box (indicated by the first "4") will be placed around picture number "14". Finally, the English or Japanese text on the second line of each utterance choice denotes the actual words which will be played, and perhaps displayed on the screen. The bracket notations indicate which words are in the "dictionary." Those words will be highlighted when displayed on the screen and, when selected by the user, will cause the corresponding page of the dictionary to be displayed. This enables the user to elect to visualize, as well as hear, the spoken words, and to quickly reference the meaning and usage of any highlighted word before continuing with the lesson.

The second Sound command (20010) is similar to the first, but contains three choices, accomodating three different performance levels. Once the user's performance level equals or exceeds two, the first two choices will be randomly "shuffled," and one of the two selected will be the actual utterance which will be played. Similarly, once the user's performance level equals or exceeds three, the selection will be made from all three choices. The two sets of numbers cause pictures "12" and "14" (large and small pictures of Max) to be displayed on the screen just as the voice is played with the "1" preceding each picture number causing these pictures to be animated. The animation is accomplished by displaying multiple pictures (as specified in the "pics" file described above) in sequence, in this case differing only in the mouth portion of the picture, creating the appearance of Max's mouth moving as he talks.

Thus, when these two Sound commands are executed from the script, the lower level driver software causes the computer to display the pictures of Max while simultaneously (or with a specified delay) causing the CD/ROM player to play Max's utterance. In the case of the second Sound command, the actual utterance which will be played will depend upon the user's performance level, which is maintained by the author in the script file through commands such as the "L" (Level) and "#" (Score Adjust) commands.

In general, each of these Sound commands corresponds to an Audiovisual Frame Segment. In other words, the first Audiovisual Frame Segment involves Max's picture being displayed and, after short delays (inserted by the author, and modifiable by the user), a smaller picture of Max being displayed and highlighted in red while a voice from the CD/ROM player introduces Max. The next Audiovisual Frame Segment involves Max's mouth being animated while Max introduces himself (again via the CD/ROM player), and so on.

Figure 2:
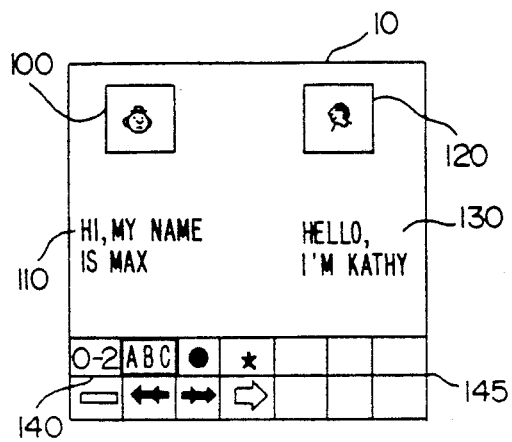
FIG. 2 illustrates the Control Bar mechanism which enables the user of the IACM to control the sequencing of Audiovisual Frame Segments.
Figure 2:
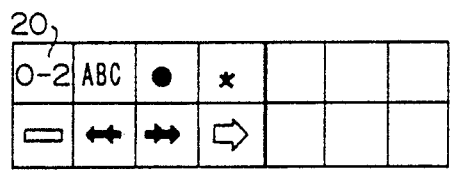
Figure 2:
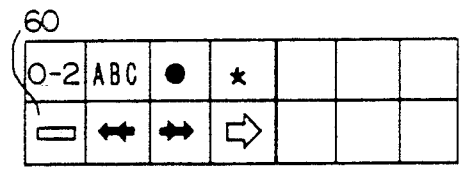
Figure 2:
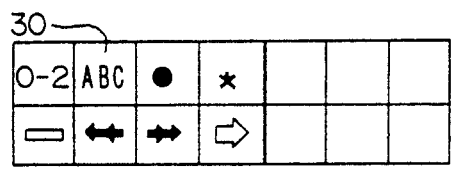
Figure 2:
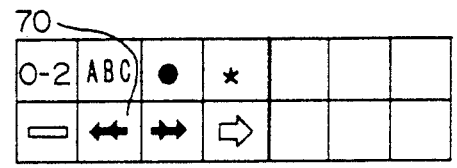
Figure 2:
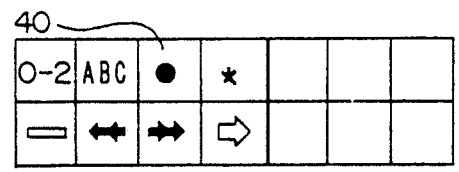
Figure 2:
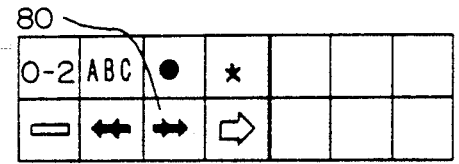
Figure 2:
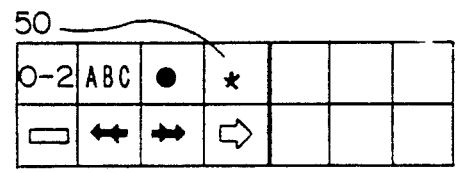
Figure 2:
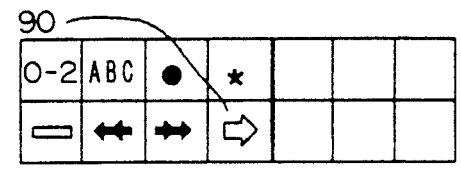

Although the lesson proceeds in a linear fashion (i.e., executing the script commands, including Sound commands sequentially), the user can at any time interrupt this process, and take control of this sequencing of Audiovisual Frame Segments, via the Control Bar illustrated in FIG. 2. Moreover, the lesson also involves user interaction, such as queries to the user, discussed below in relation to the Shuffler mechanism.

The Control Bar 140 illustrated in FIG. 2 appears at the bottom of monitor 10 and provides a means for the user to interrupt the current sequential or non-sequential flow of the lesson. The "Frame Counter" button 20 displays the user's current "location" (in units of Audiovisual Frame Segments) in the lesson. Thus, as Sound commands are encountered in the script, the frame counter is incremented. When decision points requiring use of a subroutine are reached, the first portion of the frame counter is incremented, indicating that a branch in script execution has occurred by shifting into a subroutine. For example, the first four Audiovisual Frame Segments (if linear) would be numbered, "0-1, 0-2, 0-3 and 0-4," and, if such a branch is then encountered, the next Audiovisual Frame Segment (at the portion of the script to which the branch is taken) would be numbered, "1—1," and so on.

The user can manually change his or her location in the lesson by pressing either the "Reverse" 70 or "Forward" 80 buttons, causing the frame counter to be decreased or increased, in turn causing earlier or later Audiovisual Frame Segments to be presented to the user. As a general rule, pressing the Reverse button 70 will cause the frame counter to count back to previously encountered Audiovisual Frame Segments (including traversing back through prior branches in the dynamic execution of the script commands).

The function of the Forward button 80, however, is not quite so straightforward. That button will cause the frame counter to count ahead to later Audiovisual Frame Segments (i.e., later Sound commands in the script) until a conditional branch in execution is reached. Because a conditional branch is dependent upon the user's interaction, the condition upon which the branch depends has generally not yet been determined, and thus the program cannot determine which branch location is "forward." The Forward 80 button therefore has no effect once such a conditional branch is reached.

When either the Forward 80 or Reverse 70 button is pressed, execution resumes (at the later or earlier point in the lesson) once the "Stop/Play" button 90 is pressed. The Stop/Play button 90 can also be used to stop or pause the lesson at the current Audiovisual Frame Segment.

In an interactive computer system, it is sometimes desirable not only to hear a character's voice, but also to see the text of the spoken words. This is especially true in language learning applications. Although the default condition is not to display the text of the spoken words (to encourage the user to concentrate on the words being spoken), the user has the option by pressing the "Text" button 30 to cause the current utterance (e.g., the utterance 110 recently spoken by Max 100) to be displayed on the monitor 10.

In addition to displaying the text of the current utterance, the user can also interrupt the lesson to repeat that utterance (by pressing the "Repeat" button 50), thereby reinforcing the concept illustrated by the current Audiovisual Frame Segment. By pressing the "Repeat/- Translate" button 40, the user can cause that utterance to be repeated in the specified translated language (Japanese in this embodiment). In this application, the Japanese businessman might not understand a particular utterance in English, and can thus immediately play that same utterance translated into Japanese (merely by pressing a button).

Another portion of the Control Bar, known as the "Question Box" 145, varies from lesson to lesson in the preferred embodiment. In some lessons, it contains the user's score and/or a time display (when appropriate). In other lessons, it contains question prompts and/or answers to questions. The Question Box is thus another means of interaction between the user and the system.

Finally, the user may press the "Control Panel" button 60, causing a menu to be displayed, containing certain "universal" settings which the user can modify. The precise contents of the menu will of course vary from application to application (although they will generally remain constant within the modules and lessons of an application, such as the Language Learning System). In this application, the user can select the list of modules and lessons, view the dictionary, examine his or her records (i.e., statistics maintained by the author as the user progresses through the lesson), or modify general characteristics of the program, such as the "pause multiplier" between sentences (discussed above), the current performance level and the default condition for whether to display the text of spoken words on the screen.

It is important to emphasize that the Control Bar mechanism provides the user with both control and flexibility, by enabling the user to choose (within structural limits set by the author) when to repeat prior concepts, when to advance to new material, when to display text, when to examine the definition and usage of words in the dictionary, and so forth. As mentioned above, this control over the sequencing of the lesson is independent of the technology and the sources of the audiovisual information being accessed and presented to the user.

Moreover, the Control Bar mechanism functions whether the flow of execution of the script is sequential or non-sequential. The user, via the Forward 80 and Reverse 70 buttons, can traverse through non-sequential links to other portions of the script (whether or not such links are dependent upon user interaction) in the same manner as through purely sequential, non-interactive audiovisual material. The Control Bar interface remains constant.

The user can also interact with the system in a variety of ways in addition to the Control Bar mechanism. Questions or choices can be played through the speaker or displayed on the screen, for example, via "touch points" consisting of various textual, graphic and video images. The user can then select (touch) appropriate components on the screen (using a keyboard, mouse or other input device) to generate or answer a question, select a choice or otherwise interact with the system.

Figure 3:
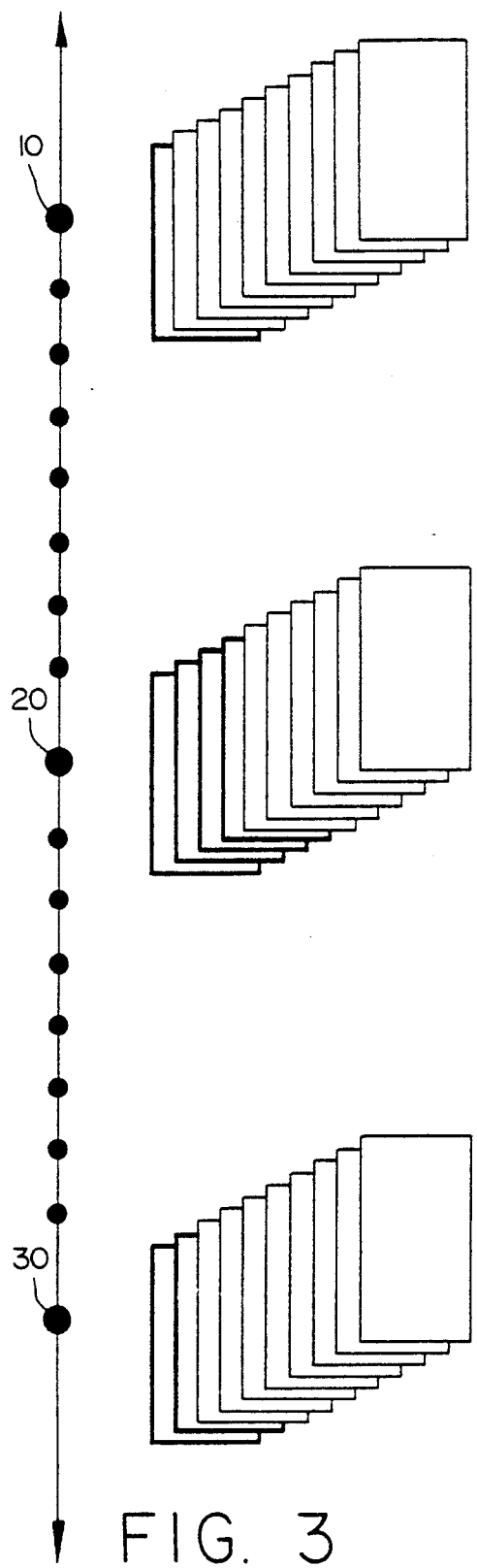
FIG. 3 illustrates the Shuffler mechanism which provides the user of the IACM with random selections of Audiovisual Frame Segments, based upon the user's performance level (determined from the user's previous interaction with the system).

The Shuffler mechanism, displayed graphically in FIG. 3, is a mechanism, transparent to the user, which controls the selection of alternative utterances (in the preferred embodiment) supplied by the author, though it can be applied to select from possible video and graphic images, as well as virtually any combination or sequence of audio and/or visual images (not to mention conditional computer calculations and practically any other element to which a user is exposed).

In general, the user's performance ("shuffler") level will begin at 1 (the lowest level), unless the user manually selects a higher level via the control panel mechanism discussed above. As the user progresses through the lesson, certain sounds will be played, and visual elements displayed, in a linear fashion (i.e., without interruption through the user's interaction with the system). Eventually, the user will reach a decision point at which time the user's action (e.g., selecting an element on the screen with the mouse) causes the lesson to "branch" to a non-sequential point in the lesson in which another linear sequence of audio and/or visual elements will be presented to the user, until the next decision point is reached, and so on.

The Shuffler mechanism illustrated in FIG. 3 is not simply a branching mechanism, although it does select one of a variable number of choices of utterances (in the preferred embodiment) to be played through the speaker. The Shuffler provides depth throughout the lesson, regardless of whether the system's interaction with the user involves a purely linear sequence or various decision points from which the user may branch elsewhere in the lesson.

For example, consider the following utterance from the middle of a linear sequence in the Listening lesson of the Meet Max and Kathy module:

| | |
|---|---|
| S 20030 | [My]AH name [is]AA Max. |
| D 100 | |
| S 30040 | What? |
| D 100 | |
| S 20030 | [My]AH name [is]AA Max. |
| D 100 | |
| S 30050 | Max. |
| D 100 | |
| S 20040 | [Yes]AJ, that's right. |

The sound file corresponding to the "My name is Max" utterance (repeated twice using the same "S 20030" sound file) contains multiple choices of utterances which the user will hear, depending upon the user's performance level. Sound file "S 20030" contains the following information for the three utterances (in both English and Japanese) created by the author:

S 20030
1E 024321-024414      000,112 000,114
[My]AH name [is]AA Max.
1J 024484-024640
Watashi no namae wa Max desu.
2E 024693-024753      000,112 000,114
[I'm]AA Max.
2J 024825-024938
Watashi wa Max desu.
3E 025016-025209      000,112 000,114
[My]AH name [is]AA Maxwell, [but]AK people call me Max.
3J 025299-025635
Watashi no namae wa Maxwell desu, demo minna wa Max to -continued vobimasu.

These three utterances (and, generally, any alternative utterances supplied by the author) differ in two ways. Some are more complex than others (e.g., "My name is Maxwell, but people call me Max" is a more complex phrase than the more introductory, "My name is Max"), and some simply offer alternative phraseology (e.g., "I'm Max"). It is important to note that the Shuffler does not simply apply each of these to a different performance level and select the one corresponding to the current level.

Instead, although each of the three utterances described above is assigned to a particular performance level, the Shuffler selects an utterance from among all the alternatives assigned to each performance level up to and including the current level. So, at level 1, the user will hear, "My name is Max;" at level 2, the user will have a 50% chance of hearing that same phrase and a 50% chance of hearing "I'm Max;" and at level 3, the user will have an equal one-third chance of hearing each of the three phrases, including the more complex phrase, "My name is Maxwell, but people call me Max".

Thus, throughout a particular linear sequence, there may be many instances in which the user is presented with information, such as an utterance, for which the author has supplied multiple choices. While at performance level 1, the user will always hear the designated level 1 utterance. At some point, however, as illustrated in FIG. 3, the user will be faced with a decision point 10 (or some other opportunity to interact with the system).

For example, the lesson might call for the user to be presented with a question (or, at higher levels, one of a number of alternative questions). If the user answers a sufficient number of these questions or other interactive responses correctly (both the number and correctness of these responses being determined by the author of the lesson), he or she will advance to the next performance level. Similarly, if a sufficient number of such responses are incorrect or otherwise inappropriate, the user will be demoted back to the previous performance level.

Thus, after answering questions at point 10 and others in the lesson, the user may work his or her way up to performance level 4. While at each level, such as level 4, every utterance (or, in other embodiments, every audio and/or visual element presented to the user) may be selected, via the Shuffler mechanism, from among a variable number (i.e., the performance level) of the alternatives supplied by the author.

Thus, while at level 4, even if the author has supplied, five, ten or some larger number of possible utterances at various points in the lesson, the Shuffler will choose from among only the first four of them (assuming at least four are available). As the user reaches additional decision points, such as point 20, the user's response will once again affect whether the user's performance level is increased or decreased. A series of incorrect responses may cause the user's level to decrease to 2, at which point each utterance will be selected from among only two alternatives, until the next decision point 30 is reached, giving the user another opportunity to increase or decrease his or her performance level.

Thus, throughout the Listening lesson of the Meet Max and Kathy module, the user is presented with various utterances spoken by Max, Kathy and other characters. The author has supplied various (though not necessarily equal) numbers of alternatives for each of these utterances. The performance level will determine, from among this maximum number of utterances, the size of the subset of alternatives from which the actual utterance will be randomly selected. The Shuffler is activated, in the preferred embodiment, for every utterance, not merely those spoken at decision points.

In this manner, the user is presented with redundancy (as relatively simple utterance are repeated even at higher levels), with significant variation (as alternative utterances may be introduced whenever the user's performance level changes), and with increasing complexity (resulting not only from more complex utterances being introduced at higher levels, but also simply from the variation which occurs whenever a new utterance is heard).

These factors combine to give the user the impression that the system is intelligent, simulating many of the variables present in actual conversation, instead of simply choosing from among a list of alternatives. Moreover, even though the Control Bar mechanism provides the user with the ability to control the direction of the lesson, the user is less likely to memorize the lesson, because the user at performance level 4, for example, may be presented with different information even when returning repeatedly to the same point in the lesson.

We claim:

1. An interactive computer system, comprising:
   a central processing unit;
   an audio output device for playing sounds;
   an audio source device for generating said sounds, said audio source device operationally connected to said central processing unit and to said audio output device;
   a visual output device for displaying visual images;
   a visual source device for generating said visual images, said visual source device operationally connected to said central processing unit and to said visual output device; and
   computer control means, operationally connected to said central processing unit for controlling said central processing unit, comprising:
     means for generating a plurality of frame segments of audiovisual information, said plurality of frame segments comprising one or more audiovisual frames, said audiovisual frames comprising one or more of said visual images being displayed on said visual output device while one or more of said sounds are being played through said audio output device,
     random access audio addressing means for non-sequentially accessing individual sounds generated by said audio source device,
     random access visual image addressing means for non-sequentially accessing individual visual images generated by said visual source device, said accessing of said individual visual images from said visual source device being independent of said accessing of said individual sounds from said audio source device, such that said visual images and sounds are not preassociated on the same recording medium,
     synchronization means for accessing individual frame segments of audiovisual information, said synchronization means causing said random access audio addressing means to access and play said sounds directly through said audio output device while simultaneously causing said random access visual addressing means to access and display said visual images directly on said visual output device, and user control means for enabling the user of said interactive computer system to interactively access frame segments of audiovisual information, such that said user control means creates new audiovisual frame segments in real time.

2. The interactive computer system of claim 1 wherein said audio source device is an optical disk device.

3. The interactive computer system of claim 1 wherein said audio source device is a CD device.

4. The interactive computer system of claim 1 wherein said audio source device is a CD/ROM device.

5. The interactive computer system of claim 1 wherein said audio source device is a CDI device.

6. The interactive computer system of claim 1 wherein said audio source device is a VDI device.

7. The interactive computer system of claim 1 wherein said audio source device is a compact disk player and wherein said visual source device is a videodisk player.

8. The interactive computer system of claim 1 wherein at least one of said audiovisual frames comprises both computer graphic visual images generated by said central processing unit and video images generated by said visual source device.

9. The interactive computer system of claim 8 wherein at least one of said audiovisual frames also comprises animated sequences of said computer graphic visual images.

10. The interactive computer system of claim 1 wherein said audio source device is capable of storing at least sixty minutes of at least FM-quality audio information, discrete portions of which are accessible within one and one-half seconds.

11. The interactive computer system of claim 1 wherein said video source device is capable of storing at least thirty minutes of digital audio information, discrete portions of which are accessible within one and one-half seconds.

12. An interactive computer system, comprising:
a central processing unit;
an audio output device for playing sounds;
an audio source device for generating said sounds, said audio source device operationally connected to said central processing unit and to said audio output device;
a visual output device for displaying visual images;
a visual source device for generating said visual images, said visual source device operationally connected to said central processing unit and to said visual output device; and
computer control means, operationally connected to said central processing unit for controlling said central processing unit, comprising:
means for generating a plurality of frame segments of audiovisual information, said plurality of frame segments comprising one or more audiovisual frames, said audiovisual frames comprising one or more visual images being displayed on said visual output device while one or more said sounds are being played through said audio output device,
random access audio addressing means for non-sequentially accessing individual sounds generated by said audio source device,
random access visual image addressing means for non-sequentially accessing individual visual images generated by said visual source device, such that said visual images and sounds are not preassociated on the same recording medium,
synchronization means for accessing individual frame segments of audiovisual information, said synchronization means causing said random access audio addressing means to access and directly play said sounds through said audio output device while simultaneously causing said random access visual addressing means to access and directly display said visual images on said visual output device.
user control means for enabling the user of said interactive computer system to interactively access frame segments of audiovisual information, such that said user control means creates new audiovisual frame segments in real time,
user level determination means for determining the performance level of the user of the interactive computer system, based upon the user's previous interaction with that system, such that said user control means creates new audiovisual frame segments in real time,
means for accessing a predefined set of related audiovisual frames,
means for generating, from said set of related audiovisual frames, a subset of said related audiovisual frames, the size of said subset being determined by the performance level of the user, and
means for selecting one of said audiovisual frames from said subset of related audiovisual frames.

13. The interactive computer system of claim 12 wherein said means for selecting one of said audiovisual frames is a pseudo-random process.

* * * * *